Nov. 12, 1935.  C. L. RINGQUIST  2,021,090

AIR CONDITIONING SYSTEM

Filed May 22, 1935

INVENTOR
Clarence L Ringquist
BY Arthur T Holmes
ATTORNEY

Patented Nov. 12, 1935

2,021,090

UNITED STATES PATENT OFFICE 2,021,090

AIR CONDITIONING SYSTEM

Clarence L. Ringquist, La Crosse, Wis., assignor to The Trane Company, La Crosse, Wis.

Application May 22, 1935, Serial No. 22,742

7 Claims. (Cl. 62—176)

My invention relates to air conditioning apparatus and more particularly to systems to maintain air conditions within an enclosure.

One of the objects of my invention is to provide a new and novel method of controlling the temperature in the enclosure by dehumidifying a portion of the air that is admitted to the air conditioning apparatus, cooling another portion of the air and admitting the moisture to the room.

Another object of my invention is to control the amount of air in one of said streams by the humidity in the enclosure.

Another object of my invention is to control the amount of cooling the other stream of air by the dry bulb thermostat in the enclosure.

Another object of my invention is to proportion the air which is admitted to the system for conditioning so that a portion of said air goes through the dehumidifying coil and another portion of that air goes through the cooling coil.

Another object of my invention is to control the said proportioning of the air by the humidity in the enclosure.

The various features of novelty which characterize my invention are pointed out in claims annexed to and forming a part of this specification.

Figure 1:
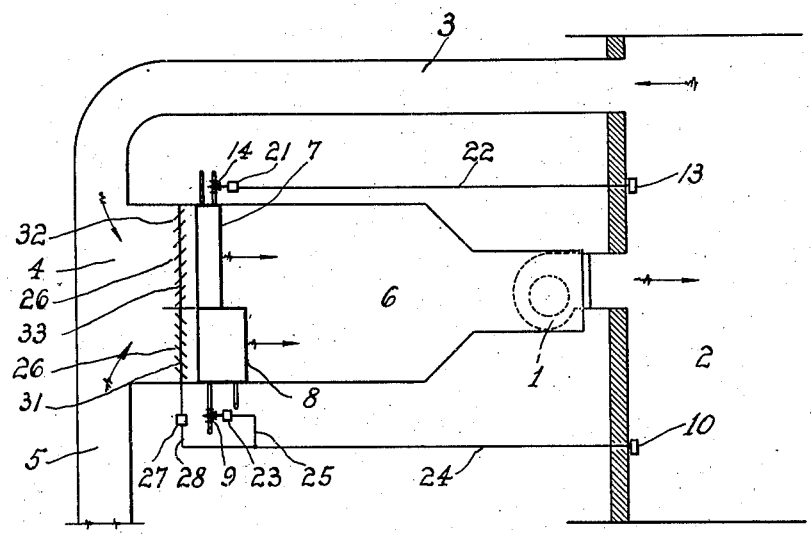

In the accompanying drawing which illustrates my invention, Figure 1 is a diagrammatic representation of a system embodying the important features of my invention.

Figure 2:
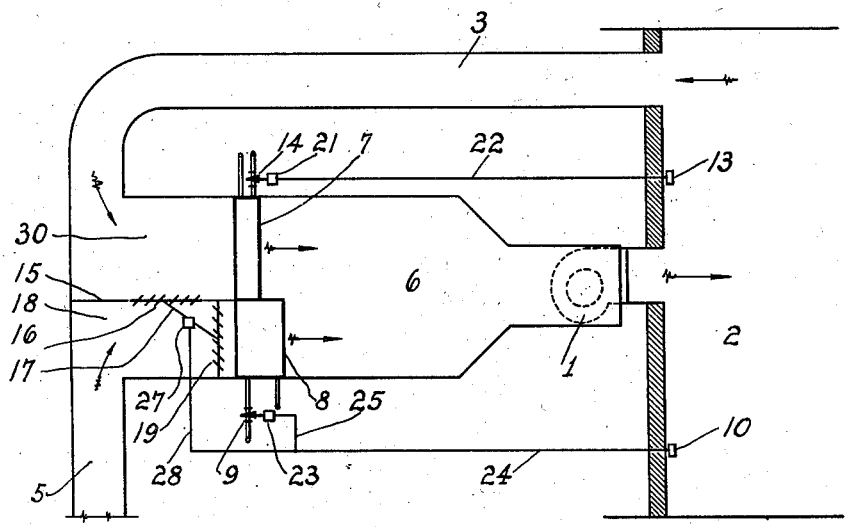

Figure 2 is a diagrammatic representation of a system similar to Figure 1, showing a variation of my invention.

Referring to Figure 1, 1 is a fan circulating air through the system and into the enclosure 2 to be conditioned. The air is returned to the system from the enclosure by the return duct 3, brought to a mixing chamber 4, where it is mixed with outside air by means of the fresh air inlet 5 admitting fresh air to the system. After the mixed air goes through the air conditioning apparatus, it is further mixed in a second mixing chamber 6.

The air conditioning apparatus consists preferably of two coils mounted within the duct 20 so that a portion of the mixed air goes through each of said coils separately. I prefer to place the coil 7, which is a sensible cooling coil, above the coil 8, which is a dehumidifying coil. The dehumidifying coil 8 is designed to condition the air passing through it to a pre-determined dew-point and extract moisture therefrom, while the sensible cooling coil 7 is not designed to extract any moisture from the air but merely to extract sensible heat therefrom and reduce the temperature of the air passing therethrough to a point above the temperature of the air passing through the dehumidifying coil.

The sensible cooling coil is supplied with a refrigerant, the flow of which is controlled by the valve 14, operated by the motor 21 controlled by a room dry bulb thermostat 13 connected to said motor by means of the line 22 so that the amount of sensible cooling to which the upper air stream is subjected is controlled by the dry bulb temperature in the enclosure. The dehumidifying coil 8 is supplied with a refrigerant controlled by the valve 9, which is operated by the motor 23 connected to a room humidistat 10 by means of the electrical lines 24 and 25. In the path of a portion of the mixed air and before the dehumidifying coil 8 is a damper 26 which controls the admission of the air to the dehumidifying coil 8. This damper is controlled by the motor 27 which is connected to the room humidistat 10 by means of the lines 24 and 28. The operation of this damper is such that upon the room requiring a greater extraction of moisture by the dehumidifying coil 8 in order to obtain the desired humidity, the damper will fully open and allow a maximum air current through the dehumidifying coil 8; and when a lesser extraction of moisture is required, the damper will correspondingly close.

A standard modulating motor is used in this connection which, when the humidistat is satisfied, will maintain the damper in a modulated position responsive to the humidistat. The valve 9 and the motor controlling the same are likewise standard modulating type which will maintain the flow of refrigerant through the coil at intermediate positions between full open and full close responsive to the humidistat 10.

It is obvious that the fan 1 being such as to maintain a constant volume of air circulating through the apparatus, the position of the interacting damper 26, composed of dampers 31 and 32 connected by the rod 33, will determine the amount of air passing both through the dehumidifying coil 8 and the sensible cooling coil 9, and will proportion the amount of mixed air which is passed through said coils.

Referring to Figure 2, the same numerals represent the same apparatus with the exception that there is shown a partition 15 separating the recirculated air from the fresh air, while damper 16 in said partition is connected with damper 19, similar to damper 26 in Figure 1 by a bar 17 so as to make dampers 16 and 19 interacting, so that when one opens the other closes proportionately. This set of dampers is operated similarly to the damper disclosed in Figure 1. 18 represents the fresh air chamber and 30 a recirculating air chamber.

The operation of Figure 2 is such that upon the room humidistat 10 being satisfied, the damper 16 will open and the damper 19 close, so that the fresh air stream will be apportioned by the sensible cooling coil and the dehumidifying coil, a portion or all of the fresh air being put into the recirculating air chamber and passed through the sensible cooling coil 7.

It is obvious that with this system the conditions in the enclosure may be maintained at the desired humidity and dry bulb temperature.

Although one specific embodiment of the invention has been particularly shown and described, it will be understood that the invention is capable of modification and that changes in the construction and in the arrangement of the various co-operating parts may be made without departing from the spirit or scope of the invention, as expressed in the following claims.

What I claim is:

1. In an apparatus for air conditioning an enclosure, means for withdrawing air from said enclosure and mixing said air with fresh air, a cooling coil, means responsive to the dry bulb temperature in said enclosure controlling the admission of refrigerant to said cooling coil, a dehumidifying coil, means responsive to the wet bulb temperature in said enclosure controlling the admission of refrigerant to said dehumidifying coil, and means to vary the amount of said mixed air going through each coil responsive to humidity in room, and means to circulate air from said coils into said enclosure.

2. In an apparatus for air conditioning an enclosure, means for withdrawing air from said enclosure and mixing said air with fresh air, a cooling coil, means responsive to the dry bulb temperature in said enclosure controlling the admission of refrigerant to said cooling coil, a dehumidifying coil, means responsive to the wet bulb temperature in said enclosure controlling the admission of refrigerant to said dehumidifying coil, a damper controlling the flow of air to said dehumidifying coil, means to control the damper responsive to wet bulb temperature in said enclosure, and means to circulate air from said coils into said enclosure.

3. In an apparatus for air conditioning an enclosure, means for withdrawing air from said enclosure and mixing said air with fresh air, a cooling coil, means to control the admission of refrigerant to said cooling coil, a dehumidifying coil, means to control the admission of refrigerant to said dehumidifying coil, means responsive to the humidity in said enclosure to vary the amount of said mixed air going through each coil, and means to circulate air from said coils into said enclosure.

4. In an apparatus for air conditioning an enclosure, a cooling coil, means responsive to the dry bulb temperature in said enclosure controlling the admission of refrigerant to said cooling coil, a de-humidifying coil, means responsive to the wet bulb temperature in said enclosure controlling the admission of refrigerant to said dehumidifying coil, means for withdrawing air from said enclosure to said cooling coil, means for admitting fresh air to the apparatus, means to apportion the fresh air to the cooling coil and dehumidifying coil, responsive to humidity in the enclosure.

5. In a method for air conditioning an enclosure, withdrawing air from said enclosure and mixing said air with fresh air, dividing said mixed air into streams, proportioning said division, cooling one stream of said mixture to a pre-determined dewpoint, controlling the amount of said cooling responsive to the humidity in said enclosure, cooling another stream of said mixture to a point above said dewpoint, controlling the amount of said cooling responsive to the dry bulb temperature in said enclosure, and mixing the said streams of air after being so conditioned and forcing the same into the enclosure.

6. In a method for air conditioning an enclosure, withdrawing air from said enclosure and mixing said air with fresh air, dividing said mixed air into streams, proportioning said division responsive to the humidity in said enclosure, cooling one stream of said mixture to a pre-determined dewpoint, controlling the amount of said cooling responsive to the humidity in said enclosure, cooling another stream of said mixture to a point above said dewpoint, controlling the amount of said cooling responsive to the dry bulb temperature in said enclosure, mixing the said streams of air after being so conditioned and forcing the same into the enclosure.

7. In a method for air conditioning an enclosure, withdrawing air from said enclosure and mixing said air with fresh air, dividing said air into streams cooling one stream of said mixture to a pre-determined dewpoint, controlling the amount of air so cooled according to the humidity in said enclosure, cooling another stream of said mixture to a point above said dewpoint responsive to the dry bulb temperature in said enclosure, mixing the said streams of air after being so conditioned and forcing the same into the enclosure.

CLARENCE L. RINGQUIST.